United States Patent
Hock (10) Patent No.: US 12,062,489 B2
(45) Date of Patent: Aug. 13, 2024

(54) HEAT DISSIPATION FROM A BALANCING CIRCUIT FOR AN ULTRACAPACITOR MODULE

(71) Applicant: AVX Corporation, Fountain Inn, SC (US)

(72) Inventor: Joseph M. Hock, Surfside Beach, SC (US)

(73) Assignee: KYOCERA AVX Components Corporation, Fountain Inn, SC (US)

( * ) Notice: Subject to any disclaimer, the term of this patent is extended or adjusted under 35 U.S.C. 154(b) by 0 days.

(21) Appl. No.: 16/019,639

(22) Filed: Jun. 27, 2018

(65) Prior Publication Data
US 2019/0006124 A1    Jan. 3, 2019

Related U.S. Application Data (60) Provisional application No. 62/527,395, filed on Jun. 30, 2017.

(51) Int. Cl.
| | | |
|---|---|---|
| *H01G 11/18* | (2013.01) | |
| *H01G 11/10* | (2013.01) | |
| *H01G 11/78* | (2013.01) | |
| *H01G 11/34* | (2013.01) | |

(52) U.S. Cl.
CPC .......... *H01G 11/18* (2013.01); *H01G 11/10* (2013.01); *H01G 11/78* (2013.01); *H01G 11/34* (2013.01)

(58) Field of Classification Search
CPC .......... H01G 4/258; H01G 4/32; H01G 11/18; H01G 11/34; H01G 11/78; H01G 11/36; H01G 11/86; H01G 11/10; H01G 11/08; H01G 1/14; H05K 7/04; H05L 7/20
See application file for complete search history.

(56) References Cited

U.S. PATENT DOCUMENTS

| | | | | |
|---|---|---|---|---|
| 5,802,087 | A | * | 9/1998 | Takaichi ................. H01S 3/042 372/35 |
| 6,487,066 | B1 | | 11/2002 | Niiori et al. |
| 6,806,686 | B1 | * | 10/2004 | Thrap ..................... H02J 7/345 320/118 |
| 6,952,338 | B1 | | 10/2005 | Gallay et al. |
| 7,016,177 | B1 | | 3/2006 | Thrap |
| 7,027,290 | B1 | | 4/2006 | Thrap |
| 7,180,726 | B2 | | 2/2007 | Thrap |
| D571,294 | S | | 6/2008 | Stanley et al. |
| D571,295 | S | | 6/2008 | Stanley et al. |

(Continued)

FOREIGN PATENT DOCUMENTS

| | | |
|---|---|---|
| CN | 102117945 | 7/2011 |
| CN | 204375872 | 6/2015 |

(Continued)

OTHER PUBLICATIONS

International Search Report and Opinion for PCT/US2018/038261 dated Oct. 8, 2018, 14 pages.

(Continued)

*Primary Examiner* — David M Sinclair
(74) *Attorney, Agent, or Firm* — Dority & Manning, P.A.

(57) ABSTRACT

A module comprises at least two ultracapacitors and at least one balancing circuit. The balancing circuit is connected to a heat dissipation component. The heat dissipation component is present on a heat sink comprising a metal.

22 Claims, 5 Drawing Sheets

(56) References Cited

U.S. PATENT DOCUMENTS

| | | | |
|---|---|---|---|
| 7,427,851 B2 | 9/2008 | Takemoto et al. | |
| 7,492,574 B2 | 2/2009 | Fresard et al. | |
| 7,511,942 B2 | 3/2009 | Thrap | |
| 7,547,233 B2 | 6/2009 | Inoue et al. | |
| 7,580,245 B2 | 8/2009 | Inoue et al. | |
| 7,830,646 B2 | 11/2010 | Eilertsen | |
| 8,098,483 B2 | 1/2012 | Eilertsen | |
| 8,194,393 B2 | 6/2012 | Inoue et al. | |
| 9,240,575 B2 | 1/2016 | Kanata et al. | |
| 9,515,510 B2 | 12/2016 | Newlin | |
| 9,738,976 B2 | 8/2017 | Pyzza et al. | |
| 2003/0214267 A1* | 11/2003 | Long | H02J 7/0016 320/116 |
| 2005/0264998 A1* | 12/2005 | McCutcheon | H01L 23/4006 361/702 |
| 2007/0053140 A1 | 3/2007 | Soliz | |
| 2008/0081245 A1 | 4/2008 | Miller | |
| 2008/0081250 A1 | 4/2008 | Miller | |
| 2008/0081251 A1 | 4/2008 | Miller | |
| 2009/0080126 A1 | 3/2009 | Wilk et al. | |
| 2009/0214940 A1* | 8/2009 | Haussmann | H01M 2/1077 429/120 |
| 2010/0015512 A1* | 1/2010 | Inoue | H01M 2/206 429/99 |
| 2010/0060243 A1* | 3/2010 | Niigaki | H01G 2/04 320/166 |
| 2010/0134940 A1* | 6/2010 | Nguyen | H01G 2/08 361/91.1 |
| 2010/0266878 A1 | 10/2010 | Eilertsen | |
| 2010/0304201 A1* | 12/2010 | Caumont | H01M 10/42 429/120 |
| 2011/0090614 A1* | 4/2011 | Guerin | H01G 11/18 361/274.3 |
| 2011/0222261 A1* | 9/2011 | Zengerle | H01M 50/213 361/830 |
| 2012/0049874 A1* | 3/2012 | LaCroix | G01R 31/2856 324/750.03 |
| 2012/0160710 A1* | 6/2012 | Saam | G01R 33/282 206/0.6 |
| 2012/0161710 A1 | 6/2012 | Mai et al. | |
| 2012/0218683 A1* | 8/2012 | Kondou | H01G 11/26 361/527 |
| 2013/0141850 A1* | 6/2013 | Honda | H01G 2/04 361/679.01 |
| 2013/0271941 A1 | 10/2013 | Guan et al. | |
| 2014/0015490 A1* | 1/2014 | Tsai | H02J 7/0042 320/134 |
| 2014/0042980 A1* | 2/2014 | Floros | H02J 7/0016 320/134 |
| 2014/0042988 A1 | 2/2014 | Kuttipillai | |
| 2014/0049222 A1* | 2/2014 | Moorhead | H02J 7/0016 320/134 |
| 2014/0217608 A1* | 8/2014 | Takayama | H01L 24/18 257/774 |
| 2014/0242436 A1 | 8/2014 | Pyzza et al. | |
| 2014/0328008 A1* | 11/2014 | Honda | H01G 11/82 361/535 |
| 2014/0377623 A1 | 12/2014 | Pyzza et al. | |
| 2016/0036248 A1* | 2/2016 | Hamada | H02J 7/0016 320/166 |
| 2016/0066475 A1 | 3/2016 | Iskanius et al. | |
| 2016/0211086 A1 | 7/2016 | Pyzza et al. | |
| 2016/0293345 A1* | 10/2016 | Oh | H01G 11/08 |
| 2017/0338054 A1 | 11/2017 | Knopsnyder et al. | |
| 2018/0012707 A1* | 1/2018 | Lee | H01G 11/82 |

FOREIGN PATENT DOCUMENTS

| | | | | |
|---|---|---|---|---|
| CN | 204632886 | 9/2015 | | |
| DE | 102010032297 | 1/2012 | | |
| JP | H05109510 | 4/1993 | | |
| JP | 10177935 A | * | 6/1998 | H01G 11/22 |
| JP | H10177935 | 6/1998 | | |
| JP | H1118429 | 1/1999 | | |
| JP | 2000164769 | 6/2000 | | |
| JP | 2014220102 | 11/2014 | | |
| KR | 20130093697 | 8/2013 | | |

OTHER PUBLICATIONS

European Search Report for PCT/US2018/038261 dated Mar. 4, 2021, 9 pages.

* cited by examiner

HEAT DISSIPATION FROM A BALANCING CIRCUIT FOR AN ULTRACAPACITOR MODULE

CROSS REFERENCE TO RELATED APPLICATION

The present application claims filing benefit of U.S. Provisional Patent Application Ser. No. 62/527,395 having a filing date of Jun. 30, 2017, which is incorporated herein by reference in its entirety.

BACKGROUND OF THE INVENTION

Electrical energy storage cells are widely used to provide power to electronic, electromechanical, electrochemical, and other useful devices. An electric double layer ultracapacitor, for instance, generally employs a pair of polarizable electrodes that contain carbon particles (e.g., activated carbon) impregnated with a liquid electrolyte. Due to the effective surface area of the particles and the small spacing between the electrodes, large capacitance values may be achieved. The individual double layer capacitors may be combined together to form a module having a raised output voltage or increased energy capacity. The individual double layer capacitors may also include a balancing circuit in order to address situations in which an overvoltage is present. However, regulating the voltage using balancing circuits may lead to overheating of the circuits. In certain instances, heat dissipation components are mounted directly on a circuit board containing the balancing circuit. However, doing so may result in damaging the circuit board if heat is not dissipated effectively. As such, a need currently exists for an ultracapacitor containing a balancing circuit that is capable of dissipating heat in an effective manner.

SUMMARY OF THE INVENTION

In accordance with one embodiment of the present invention, a module is disclosed that comprises at least two ultracapacitors and at least one balancing circuit, wherein the balancing circuit is connected to a heat dissipation component, and wherein the heat dissipation component is present on a heat sink comprising a metal.

Other features and aspects of the present invention are set forth in greater detail below.

BRIEF DESCRIPTION OF THE DRAWINGS

A full and enabling disclosure of the present invention, including the best mode thereof, directed to one of ordinary skill in the art, is set forth more particularly in the remainder of the specification, which makes reference to the appended figure in which.

Repeat use of reference characters in the present specification and drawing is intended to represent same or analogous features or elements of the invention.

DETAILED DESCRIPTION OF REPRESENTATIVE EMBODIMENTS

It is to be understood by one of ordinary skill in the art that the present discussion is a description of exemplary embodiments only, and is not intended as limiting the broader aspects of the present invention, which broader aspects are embodied in the exemplary construction.

Generally speaking, the present invention is directed to a module that contains at least two ultracapacitors and at least one balancing circuit. The balancing circuit is connected to a heat dissipation component and the heat dissipation component is present on a heat sink comprising a metal. By selectively controlling the location of the heat dissipation component, heat generated from the balancing circuit can be dissipated effectively without compromising the performance of the ultracapacitor or the balancing circuit. In particular, by placing the heat dissipation component on a heat sink comprising a metal rather than a circuit board as typically employed in the art, the heat generated by the balancing circuit can be efficiently and effectively dissipated through the heat dissipation component and the heat sink rather than remaining in the general proximity of the circuit board. In this manner, the module can maintain good electrical and thermal properties under a wide variety of conditions and may have an extended operational life.

In general, balancing circuits are employed to prevent current, such as leakage current, from causing damage to other ultracapacitor through over-voltage. Such balancing can help regulate the voltage across each ultracapacitor such that they are substantially the same. In this regard, in one embodiment, the balancing circuit may be referred to as a voltage balancing circuit. Nevertheless, even if it is referred to generally as a voltage balancing circuit, the module and balancing circuit may also include a current control device for controlling the current flowing through the ultracapacitors according to a signal provided by a feedback loop.

The balancing circuit employed with respect to the present invention is not necessarily limited. So long as the balancing circuit can effectively balance the voltage across the ultracapacitors, it may be employed according to the present invention. In general, the balancing circuits are electrically connected to the ultracapacitors. Such electrical connection is not necessarily limited so long as it allows for controlling and/or regulating the voltage of the ultracapacitors.

The balancing circuits may include any number of electronic components, including active and passive components. The components can include any combination of transistors, resistors, regulators, attenuators, potentiometers, thermistors, diodes (e.g., Zener diodes), comparators (e.g., voltage comparators), amplifiers (e.g., operational amplifiers), voltage dividers, etc. It should be appreciated that these electronic components may be configured in any manner of ways in order to effectively balance a circuit. In some instances, the balancing circuits may include additional components such as alarms (e.g., sound or light such as LEDs) to notify the presence of an over-voltage. Examples of balancing circuits that may be employed include those as U.S. Pat. No. 6,806,686 to Thrap, U.S. Pat. No. 7,880,449 to Thrap, U.S. Publication No. 2003/0214267 to Long, and U.S. Publication No. 2016/0301221 to Kaminsky.

Any number of balancing circuits may be employed according to the present invention. For instance, the module contains at least one balancing circuit and in some embodiments at least two balancing circuits. However, it should be understood that the module may contain more balancing circuits. For instance, the module may contain 4 or more, such as 6 or more, such as 8 or more, and in some embodiments, from 8 to 30 individual balancing circuits. In one embodiment, there is at least one balancing circuit per ultracapacitor. In another embodiment, there is a balancing circuit between every two capacitors such that the number of balancing circuits is one less than the number of ultracapacitors.

Figure 1:
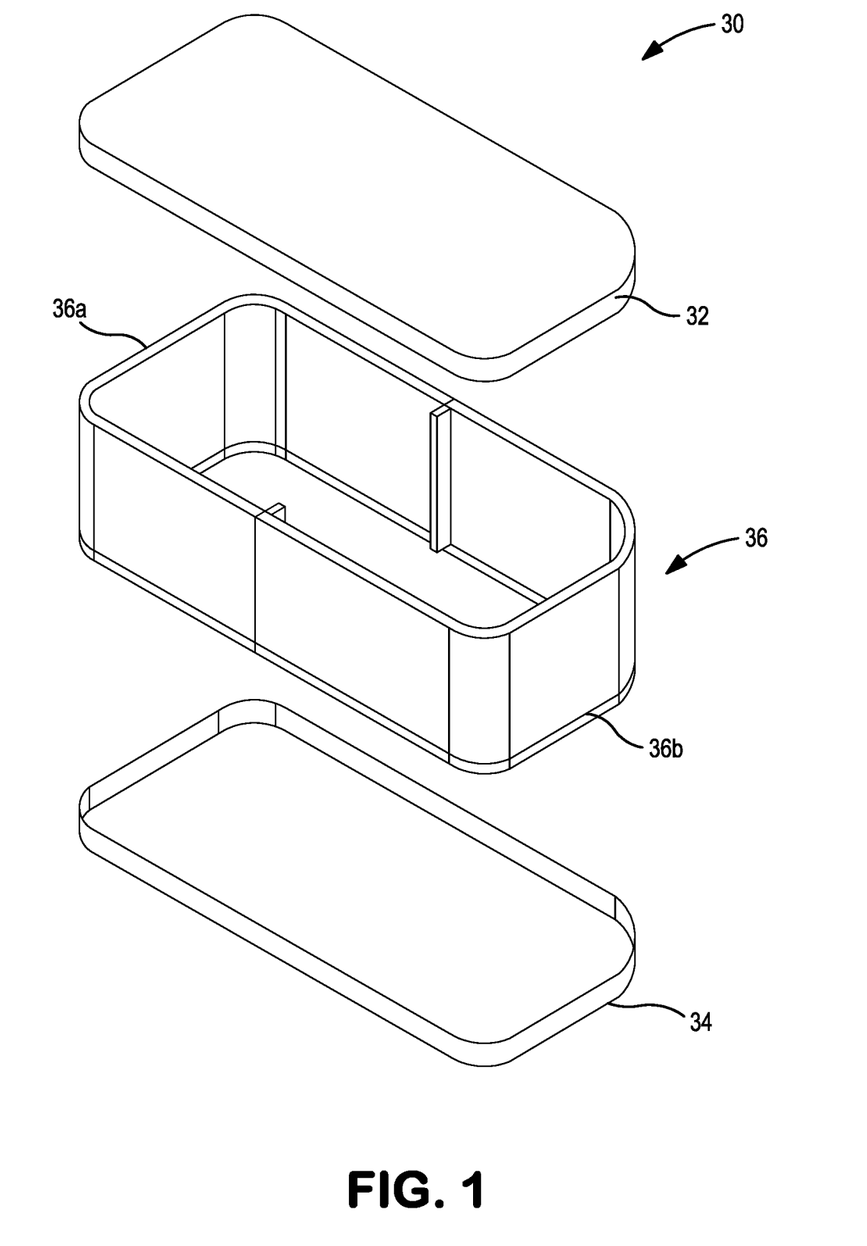
FIG. 1 is an exploded view of one embodiment of a module housing that may be employed to house the module of the present invention.

The balancing circuit can be provided and configured in the module using any method generally known in the art. In this regard, the particular manner is not necessarily limited. In one embodiment, the balancing circuit is provided on a circuit board, such as a printed circuit board. The balancing circuit and the circuit board may be positioned within the module in any configuration. With reference to FIG. 1, in one embodiment, the circuit board (not shown) containing the balancing circuit may be positioned between the top of the ultracapacitors (not shown) and a top surface 32 of the module housing 30. In general, as also illustrated in FIG. 1, the housing includes a top surface 32, a bottom surface 34 opposite the top surface 32, and a side surface 36 extending between the top surface 32 and the bottom surface 34. In this regard, the ultracapacitors may be sandwiched between the top surface 32 and the bottom surface 34 of the module housing 30. In addition, the module housing 30 may also include external terminals or connections (not shown) for use and connection to a device.

The embodiment of FIG. 1 contains a module having 18 ultracapacitors. However, the number of ultracapacitors is not limited by the present invention. For instance, the module contains at least two ultracapacitors but can contain more than 2 ultracapacitors, such as 4 or more, such as 6 or more, such as 8 or more, and in some embodiments, from 8 to 30 individual ultracapacitors.

As described herein, the module includes a heat dissipation component for assisting in the transfer of heat from the balancing circuit and to the heat sink. In this regard, the particular heat dissipation components employed are not necessarily limited. In general, the heat dissipation component may be an electronic component. In this regard, the electronic component may be any discrete device that is typically employed in electronic circuits. Notably, the heat dissipation component may be an active component, a passive component, or may include both an active component and a passive component.

In one embodiment, the heat dissipation component may be an active component. The active component may be a transistor. In particular, the transistor may be a field-effect transistor, such as a metal-oxide-semiconductor field-effect transistor. The dielectric material employed as the gate material in such transistors may be any employed in the art such as, but not limited to, polysilicon, silicon dioxide, etc. In another embodiment, the heat dissipation component may be a passive component. The passive component may be a resistor, such as a load resistor. In one particular embodiment, the heat dissipation component may include both an active component and a passive component. That is, the heat dissipation component may include a transistor and a resistor.

In general, the heat dissipation component is electrically connected to the balancing circuit. Any number of heat dissipation components may be employed according to the present invention. For instance, the module contains at least one heat dissipation component and in some embodiments at least two heat dissipation components. However, it should be understood that the module may contain more heat dissipation components. For instance, the module may contain 4 or more, such as 6 or more, such as 8 or more, and in some embodiments, from 8 to 60 individual heat dissipation components, such as from 8 to 30 individual heat dissipation components. In one embodiment, there is at least one heat dissipation component per balancing circuit. In another embodiment, there are at least two heat dissipation components per balancing circuit. For instance, such embodiment may include the utilization of a transistor and a resistor as the heat dissipation components.

As the balancing circuit begins to increase in temperature and generate heat, so does the heat dissipation component. That is, because the heat dissipation component is connected to the balancing circuit, in particular the balancing circuit on the circuit board, heat is also transferred to the heat dissipation component. Because the heat dissipation component is present on a heat sink, the heat dissipation component allows for the transfer of heat generated by the balancing circuit to the heat sink. This then allows for heat dissipation away from the balancing circuit. When the heat dissipation component is present on the circuit board for removing heat, such heat may still remain within the proximity of the balancing circuit, in particular the circuit board containing the balancing circuit.

According to the present invention, the heat dissipation component is on a heat sink comprising a metal. In general, the heat sink allows for the transfer of heat or thermal energy generated by the balancing circuit. That is, as the balancing circuit gains heat and it is transferred to the heat dissipation component, the heat from the heat dissipation component is transferred to the heat sink. In general, the heat sink has a larger surface area than the heat dissipation component. Such larger surface area can be more effective dissipating heat away from the balancing circuit so that it, along with the ultracapacitor, may operate effectively. In one embodiment, the surface area of the heat sink is at least 100%, such as at least 500%, such as at least 1,000% greater, such as at least 10,000% greater than the surface area of the heat dissipation component.

As indicated herein, the heat dissipation component is on a heat sink. In this regard, the heat dissipation component is present on a surface other than a circuit board, in particular one containing the balancing circuit. Selectively controlling the location of the heat dissipation component allows for heat dissipation away from the balancing circuit without compromising the performance of the balancing circuit and the circuit board and in turn the ultracapacitors. The manner in which the heat dissipation component is positioned on the heat sink is, however, not limited. For instance, it may be connected, mounted, attached, etc. to the heat sink containing a metal so long as the such connection, mounting, attachment, etc. allows for the transfer of heat/thermal energy from the heat dissipation component to the heat sink. In one embodiment, the heat dissipation component may be positioned directly on the heat sink. In another embodiment, an intermediate material may be present between the heat dissipation component and the heat sink. In such embodiment, the intermediate material may be a thermally conductive metal as defined herein.

The heat sink may be formed from any metal known in the art that can allow for effective dissipation of heat. For instance, the metal may be any thermally conductive metal. Notably, the metal may have a thermal conductivity of about 50 W/m·K or more, such as about 100 W/m·K, such as about 150 W/m·K or more, such as about 200 W/m·K, such as about 250 W/m·K, such as about 300 W/m·K to about 600 W/m·K or less, such as about 500 W/m·K or less, such as about 450 W/m·K or less. The heat sink may be formed from silver, copper, gold, aluminum, molybdenum, zinc, lithium, tungsten, nickel, iron, palladium platinum, tin, an alloy thereof, or a combination thereof. Alloys include, but are not limited to, steel (e.g., stainless steel), brass, bronze, etc. Aluminum is particularly suitable for use in the present invention.

The heat sink may be any general material employed in the housing that can allow for heat dissipation. In one embodiment, a part of the housing of the module may define the heat sink. That is, at least a part of the module housing may be formed from a metal. In this regard, the heat dissipation component may be present on an interior face of a surface of the module housing. An interior face, as opposed to an exterior face, is meant to refer to a surface that is facing the ultracapacitors.

Figure 2:
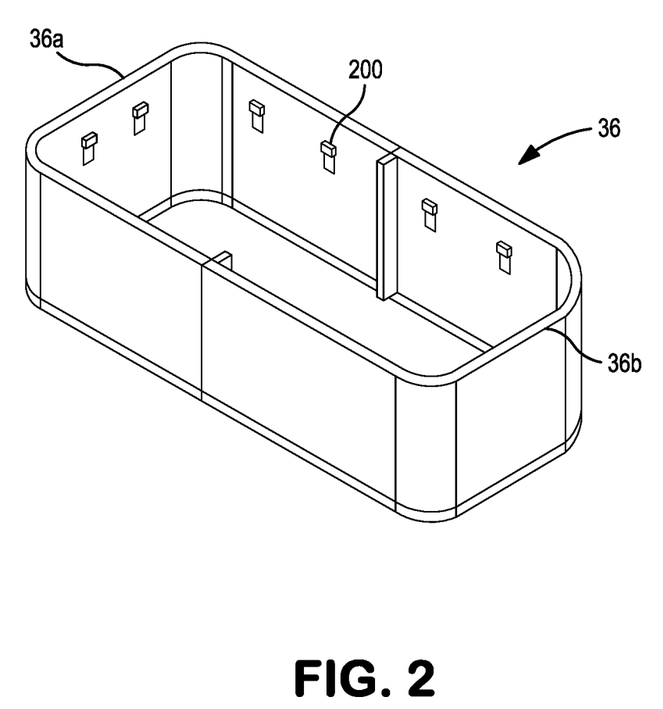
FIG. 2 is a perspective view of a heat dissipation component on a side surface of the housing in accordance with one embodiment of the present invention.

In one particular embodiment, at least a side surface is formed from a metal. As illustrated in FIG. 2, the heat dissipation component 200 is present on a side surface 36 of the module housing. In such embodiment, the top surface (not shown) and/or the bottom surface (not shown) of the module housing may be formed from a plastic, a metal, a combination thereof or a composite thereof. In one embodiment, at least the bottom surface of the module housing may be formed from a plastic. The interior face of the bottom surface may also be recessed allowing for proper positioning of the ultracapacitors within the housing such that the ultracapacitors may sit in the recessed portions. The recess may be one recess for a plurality of recesses. For instance, if only one recess, then all of the ultracapacitors may sit in the one recess. However, if plurality of recesses are present, then in one embodiment, each ultracapacitor may sit in an individual recess. Alternatively, a plurality of ultracapacitors may sit in one of the recesses wherein the bottom surface contains a plurality of recesses. Such recess may minimize any vibrational forces, which may affect performance that may occur during installation or use.

The bottom surface, the top surface, and the side surface(s) may enclose the module. For instance, the side surface may be formed such that it surrounds the entire module assembly (i.e., ultracapacitors in the module). In this regard, the side surface may be one unitary piece that extends between the top surface and the bottom surface and extends around the entire module assembly. In another embodiment, as illustrated in FIG. 1, the side surface may include two sections 36a and 36b that are combined together to form the side surface of the module housing. In another embodiment, the side surface may include four sections that are combined together to form the sides of the module housing. In this regard, the particular manner in which the side surfaces are presented are not limited by the present invention.

The heat dissipation components may be present on any surface in any combination so long as such surface includes a metal and may serve as a heat sink. In one embodiment, the heat dissipation components are present on a combination of the top surface or bottom surface and the side surface. In one particular embodiment, the heat dissipation components are all present on the side surface of the housing, and in particular an interior face of the side surface.

Figure 3:
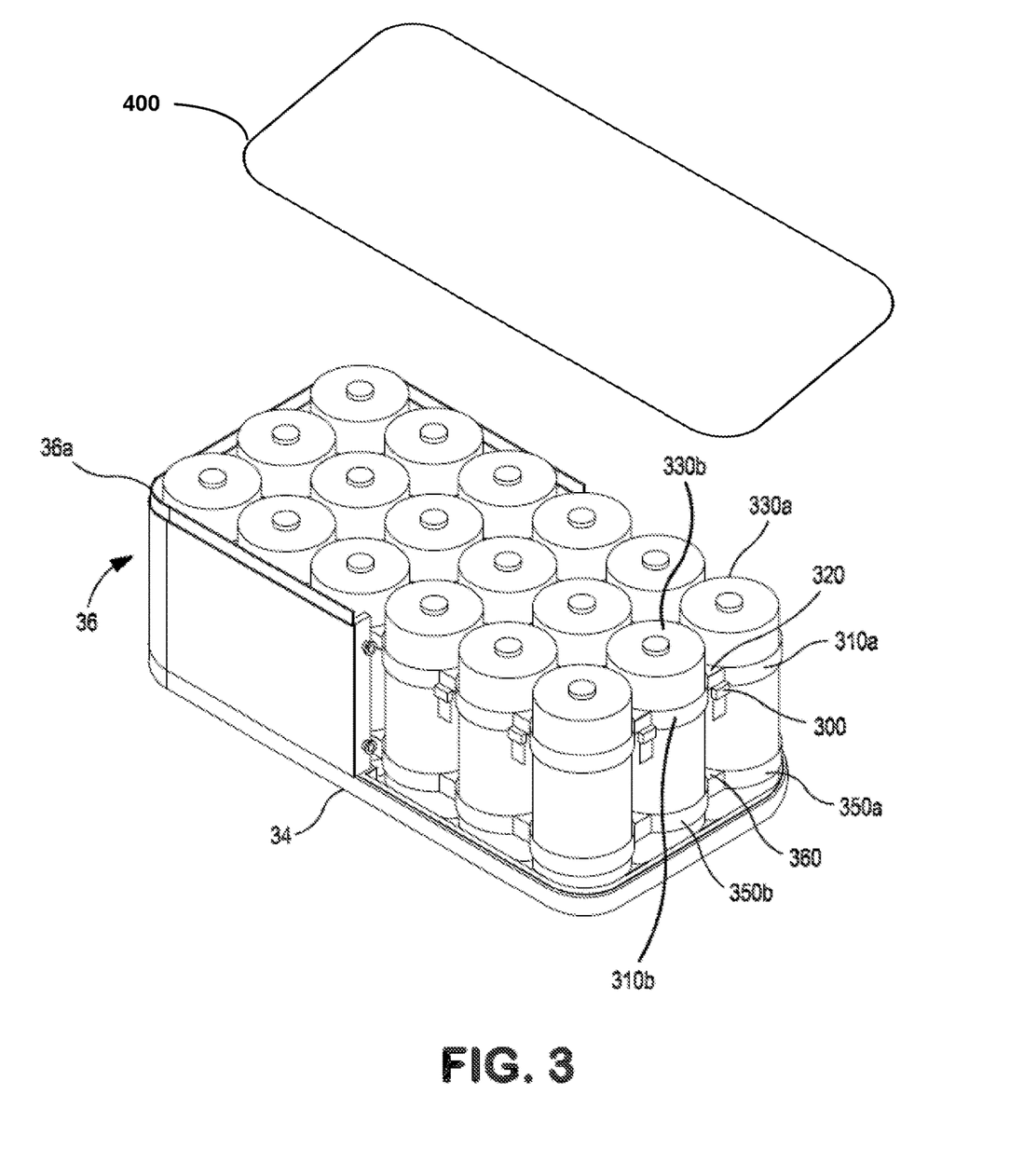
FIG. 3 is a perspective view of a module containing a heat dissipation component on an interconnecting bridge connecting adjacent respective braces surrounding respective ultracapacitors in accordance with one embodiment of the present invention.

In another embodiment, the heat sink may be formed around at least part of the circumference of an ultracapacitor. For instance, the heat sink may be in the form of a brace around the ultracapacitor. The brace may contact or may not contact the ultracapacitor. In one embodiment, the brace completely surrounds the circumference of the ultracapacitors. In addition, the braces of adjacent ultracapacitors are connected. For instance, the respective braces may be connected by an interconnecting bridge. In this regard, the heat dissipation component may be present on the brace and/or the area connecting the adjacent braces, such as on the interconnecting bridge. In one particular embodiment, as illustrated in FIG. 3, the heat dissipation components 300 are present on the area connecting the adjacent braces 310a and 310b, such as on the interconnecting bridge 320, of the respective ultracapacitors 330a and 330b.

As indicated herein, it should be understood that the module may contain more than two ultracapacitors. For instance, the module may contain four ultracapacitors. Each ultracapacitor may have a brace surrounding at least part of the circumference of the ultracapacitor. Adjacent braces may be connected by one or more interconnecting bridges. When the module contains a plurality of ultracapacitors and in turn a plurality of braces and interconnecting bridges, such braces and interconnecting bridges may form an integral structure, such as a unitary integral structure. Such structure would also define the heat sink.

In addition, the brace may have a dual function. For instance, it may provide mechanical stability by minimizing any vibrational forces and it may also serve as a heat sink for dissipating heat away from the balancing circuit. In one embodiment, as illustrated in FIG. 3, the ultracapacitors 330a and 330b may have a second brace 350a and 350b, respectively, and a second interconnecting bridge 360. However, such brace and interconnecting bridge may be employed only for providing mechanical stability. In one embodiment, the first brace and interconnecting bridge are closer to the circuit board and the balancing circuit then the second brace and interconnecting bridge. In addition, as also illustrated in FIG. 3, the module includes a balancing circuit 400. As illustrated, the balancing circuit 400 is not shown connected to the ultracapacitors, such as ultracapacitors 330a and 330b, for the sake of clarity. However, it should be understood that the balancing circuit is electrically connected to the ultracapacitors.

Any of a variety of different individual ultracapacitors may generally be employed in the module of the present invention. Generally speaking, however, the ultracapacitor contains an electrode assembly and electrolyte contained and optionally hermetically sealed within a housing. The electrode assembly may, for instance, contain a first electrode that contains a first carbonaceous coating (e.g., activated carbon particles) electrically coupled to a first current collector, and a second electrode that contains a second carbonaceous coating (e.g., activated carbon particles) electrically coupled to a second current collector. It should be understood that additional current collectors may also be employed if desired, particularly if the ultracapacitor includes multiple energy storage cells. The current collectors may be formed from the same or different materials. Regardless, each collector is typically formed from a substrate that includes a conductive metal, such as aluminum, stainless steel, nickel, silver, palladium, etc., as well as alloys thereof. Aluminum and aluminum alloys are particularly suitable for use in the present invention. The substrate may be in the form of a foil, sheet, plate, mesh, etc. The substrate may also have a relatively small thickness, such as about 200 micrometers or less, in some embodiments from about 1 to about 100 micrometers, in some embodiments from about 5 to about 80 micrometers, and in some embodiments, from about 10 to about 50 micrometers. Although by no means required, the surface of the substrate may be optionally roughened, such as by washing, etching, blasting, etc.

First and second carbonaceous coatings are also electrically coupled to the first and second current collectors, respectively. While they may be formed from the same or different types of materials and may contain one or multiple layers, each of the carbonaceous coatings generally contains at least one layer that includes activated particles. In certain embodiments, for instance, the activated carbon layer may be directly positioned over the current collector and may optionally be the only layer of the carbonaceous coating. Examples of suitable activated carbon particles may include, for instance, coconut shell-based activated carbon, petroleum coke-based activated carbon, pitch-based activated carbon, polyvinylidene chloride-based activated carbon, phenolic resin-based activated carbon, polyacrylonitrile-based activated carbon, and activated carbon from natural sources such as coal, charcoal or other natural organic sources.

In certain embodiments, it may be desired to selectively control certain aspects of the activated carbon particles, such as their particle size distribution, surface area, and pore size distribution to help improve ion mobility for certain types of electrolytes after being subjected to one or more charge-discharge cycles. For example, at least 50% by volume of the particles (D50 size) may have a size in the range of from about 0.01 to about 30 micrometers, in some embodiments from about 0.1 to about 20 micrometers, and in some embodiments, from about 0.5 to about 10 micrometers. At least 90% by volume of the particles (D90 size) may likewise have a size in the range of from about 2 to about 40 micrometers, in some embodiments from about 5 to about 30 micrometers, and in some embodiments, from about 6 to about 15 micrometers. The BET surface may also range from about 900 $m^2/g$ to about 3,000 $m^2/g$, in some embodiments from about 1,000 $m^2/g$ to about 2,500 $m^2/g$, and in some embodiments, from about 1,100 $m^2/g$ to about 1,800 $m^2/g$.

In addition to having a certain size and surface area, the activated carbon particles may also contain pores having a certain size distribution. For example, the amount of pores less than about 2 nanometers in size (i.e., "micropores") may provide a pore volume of about 50 vol. % or less, in some embodiments about 30 vol. % or less, and in some embodiments, from 0.1 vol. % to 15 vol. % of the total pore volume. The amount of pores between about 2 nanometers and about 50 nanometers in size (i.e., "mesopores") may likewise be from about 20 vol. % to about 80 vol. %, in some embodiments from about 25 vol. % to about 75 vol. %, and in some embodiments, from about 35 vol. % to about 65 vol. %. Finally, the amount of pores greater than about 50 nanometers in size (i.e., "macropores") may be from about 1 vol. % to about 50 vol. %, in some embodiments from about 5 vol. % to about 40 vol. %, and in some embodiments, from about 10 vol. % to about 35 vol. %. The total pore volume of the carbon particles may be in the range of from about 0.2 $cm^3/g$ to about 1.5 $cm^3/g$, and in some embodiments, from about 0.4 $cm^3/g$ to about 1.0 $cm^3/g$, and the median pore width may be about 8 nanometers or less, in some embodiments from about 1 to about 5 nanometers, and in some embodiments, from about 2 to about 4 nanometers. The pore sizes and total pore volume may be measured using nitrogen adsorption and analyzed by the Barrett-Joyner-Halenda ("BJH") technique as is well known in the art.

If desired, binders may be present in an amount of about 60 parts or less, in some embodiments 40 parts or less, and in some embodiments, from about 1 to about 25 parts per 100 parts of carbon in the first and/or second carbonaceous coatings. Binders may, for example, constitute about 15 wt. % or less, in some embodiments about 10 wt. % or less, and in some embodiments, from about 0.5 wt. % to about 5 wt. % of the total weight of a carbonaceous coating. Any of a variety of suitable binders can be used in the electrodes. For instance, water-insoluble organic binders may be employed in certain embodiments, such as styrene-butadiene copolymers, polyvinyl acetate homopolymers, vinyl-acetate ethylene copolymers, vinyl-acetate acrylic copolymers, ethylene-vinyl chloride copolymers, ethylene-vinyl chloride-vinyl acetate terpolymers, acrylic polyvinyl chloride polymers, acrylic polymers, nitrile polymers, fluoropolymers such as polytetrafluoroethylene or polyvinylidene fluoride, polyolefins, etc., as well as mixtures thereof. Water-soluble organic binders may also be employed, such as polysaccharides and derivatives thereof. In one particular embodiment, the polysaccharide may be a nonionic cellulosic ether, such as alkyl cellulose ethers (e.g., methyl cellulose and ethyl cellulose); hydroxyalkyl cellulose ethers (e.g., hydroxyethyl cellulose, hydroxypropyl cellulose, hydroxypropyl hydroxybutyl cellulose, hydroxyethyl hydroxypropyl cellulose, hydroxyethyl hydroxybutyl cellulose, hydroxyethyl hydroxypropyl hydroxybutyl cellulose, etc.); alkyl hydroxyalkyl cellulose ethers (e.g., methyl hydroxyethyl cellulose, methyl hydroxypropyl cellulose, ethyl hydroxyethyl cellulose, ethyl hydroxypropyl cellulose, methyl ethyl hydroxyethyl cellulose and methyl ethyl hydroxypropyl cellulose); carboxyalkyl cellulose ethers (e.g., carboxymethyl cellulose); and so forth, as well as protonated salts of any of the foregoing, such as sodium carboxymethyl cellulose.

Other materials may also be employed within an activated carbon layer of the first and/or second carbonaceous coatings and/or within other layers of the first and/or second carbonaceous coatings. For example, in certain embodiments, a conductivity promoter may be employed to further increase electrical conductivity. Exemplary conductivity promoters may include, for instance, carbon black, graphite (natural or artificial), graphite, carbon nanotubes, nanowires or nanotubes, metal fibers, graphenes, etc., as well as mixtures thereof. Carbon black is particularly suitable. When employed, conductivity promoters typically constitute about 60 parts or less, in some embodiments 40 parts or less, and in some embodiments, from about 1 to about 25 parts per 100 parts of the activated carbon particles in a carbonaceous coating. Conductivity promotes may, for example, constitute about 15 wt. % or less, in some embodiments about 10 wt. % or less, and in some embodiments, from about 0.5 wt. % to about 5 wt. % of the total weight of a carbonaceous coating. Activated carbon particles likewise typically constitute 85 wt. % or more, in some embodiments about 90 wt. % or more, and in some embodiments, from about 95 wt. % to about 99.5 wt. % of a carbonaceous coating.

The particular manner in which a carbonaceous coating is applied to a current collector may vary as is well known to those skilled in the art, such as printing (e.g., rotogravure), spraying, slot-die coating, drop-coating, dip-coating, etc. Regardless of the manner in which it is applied, the resulting electrode is typically dried to remove moisture from the coating, such as at a temperature of about 100° C. or more, in some embodiments about 200° C. or more, and in some embodiments, from about 300° C. to about 500° C. The electrode may also be compressed (e.g., calendered) to optimize the volumetric efficiency of the ultracapacitor. After any optional compression, the thickness of each carbonaceous coating may generally vary based on the desired electrical performance and operating range of the ultracapacitor. Typically, however, the thickness of a coating is from about 20 to about 200 micrometers, 30 to about 150 micrometers, and in some embodiments, from about 40 to about 100 micrometers. Coatings may be present on one or both sides of a current collector. Regardless, the thickness of the overall electrode (including the current collector and the carbonaceous coating(s) after optional compression) is typically within a range of from about 20 to about 350 micrometers, in some embodiments from about 30 to about 300 micrometers, and in some embodiments, from about 50 to about 250 micrometers.

The electrode assembly also typically contains a separator that is positioned between the first and second electrodes. If desired, other separators may also be employed in the electrode assembly. For example, one or more separators may be positioned over the first electrode, the second electrode, or both. The separators enable electrical isolation of one electrode from another to help prevent an electrical short, but still allow transport of ions between the two electrodes. In certain embodiments, for example, a separator may be employed that includes a cellulosic fibrous material (e.g., airlaid paper web, wet-laid paper web, etc.), nonwoven fibrous material (e.g., polyolefin nonwoven webs), woven fabrics, film (e.g., polyolefin film), etc. Cellulosic fibrous materials are particularly suitable for use in the ultracapacitor, such as those containing natural fibers, synthetic fibers, etc. Specific examples of suitable cellulosic fibers for use in the separator may include, for instance, hardwood pulp fibers, softwood pulp fibers, rayon fibers, regenerated cellulosic fibers, etc. Regardless of the particular materials employed, the separator typically has a thickness of from about 5 to about 150 micrometers, in some embodiments from about 10 to about 100 micrometers, and in some embodiments, from about 20 to about 80 micrometers.

The manner in which the components of the electrode assembly are combined together may vary as is known in the art. For example, the electrodes and separator may be initially folded, wound, or otherwise contacted together to form an electrode assembly. In one particular embodiment, the electrodes, separator, and optional electrolyte may be wound into an electrode assembly having a "jelly-roll" configuration.

To form an ultracapacitor, an electrolyte is placed into ionic contact with the first electrode and the second electrode before, during, and/or after the electrodes and separator are combined together to form the electrode assembly. The electrolyte is generally nonaqueous in nature and thus contains at least one nonaqueous solvent. To help extend the operating temperature range of the ultracapacitor, it is typically desired that the nonaqueous solvent have a relatively high boiling temperature, such as about 150° C. or more, in some embodiments about 200° C. or more, and in some embodiments, from about 220° C. to about 300° C. Particularly suitable high boiling point solvents may include, for instance, cyclic carbonate solvents, such as ethylene carbonate, propylene carbonate, butylene carbonate, vinylene carbonate, etc. Of course, other nonaqueous solvents may also be employed, either alone or in combination with a cyclic carbonate solvent. Examples of such solvents may include, for instance, open-chain carbonates (e.g., dimethyl carbonate, ethyl methyl carbonate, diethyl carbonate, etc.), aliphatic monocarboxylates (e.g., methyl acetate, methyl propionate, etc.), lactone solvents (e.g., butyrolactone valerolactone, etc.), nitriles (e.g., acetonitrile, glutaronitrile, adiponitrile, methoxyacetonitrile, 3-methoxypropionitrile, etc.), amides (e.g., N, N-dimethylformamide, N,N-diethylacetamide, N-methylpyrrolidinone), alkanes (e.g., nitromethane, nitroethane, etc.), sulfur compounds (e.g., sulfolane, dimethyl sulfoxide, etc.); and so forth.

The electrolyte may also contain at least one ionic liquid, which is dissolved in the nonaqueous solvent. While the concentration of the ionic liquid can vary, it is typically desired that the ionic liquid is present at a relatively high concentration. For example, the ionic liquid may be present in an amount of about 0.8 moles per liter (M) of the electrolyte or more, in some embodiments about 1.0 M or more, in some embodiments about 1.2 M or more, and in some embodiments, from about 1.3 to about 1.8 M.

The ionic liquid is generally a salt having a relatively low melting temperature, such as about 400° ° C. or less, in some embodiments about 350° C. or less, in some embodiments from about 1° ° C. to about 100° C., and in some embodiments, from about 5° C. to about 50° C. The salt contains a cationic species and counterion. The cationic species contains a compound having at least one heteroatom (e.g., nitrogen or phosphorous) as a "cationic center." Examples of such heteroatomic compounds include, for instance, unsubstituted or substituted organoquaternary ammonium compounds, such as ammonium (e.g., trimethylammonium, tetraethylammonium, etc.), pyridinium, pyridazinium, pyramidinium, pyrazinium, imidazolium, pyrazolium, oxazolium, triazolium, thiazolium, quinolinium, piperidinium, pyrrolidinium, quaternary ammonium spiro compounds in which two or more rings are connected together by a spiro atom (e.g., carbon, heteroatom, etc.), quaternary ammonium fused ring structures (e.g., quinolinium, isoquinolinium, etc.), and so forth. In one particular embodiment, for example, the cationic species may be an N-spirobicyclic compound, such as symmetrical or asymmetrical N-spirobicyclic compounds having cyclic rings. One example of such a compound has the following structure:

wherein m and n are independently a number from 3 to 7, and in some embodiments, from 4 to 5 (e.g., pyrrolidinium or piperidinium).

Suitable counterions for the cationic species may likewise include halogens (e.g., chloride, bromide, iodide, etc.); sulfates or sulfonates (e.g., methyl sulfate, ethyl sulfate, butyl sulfate, hexyl sulfate, octyl sulfate, hydrogen sulfate, methane sulfonate, dodecylbenzene sulfonate, dodecylsulfate, trifluoromethane sulfonate, heptadecafluorooctanesulfonate, sodium dodecylethoxysulfate, etc.); sulfosuccinates; amides (e.g., dicyanamide); imides (e.g., bis (pentafluoroethyl-sulfonyl)imide, bis (trifluoromethylsulfonyl)imide, bis(trifluoromethyl)imide, etc.); borates (e.g., tetrafluoroborate, tetracyanoborate, bis [oxalato]borate, bis[salicylato]borate, etc.); phosphates or phosphinates (e.g., hexafluorophosphate, diethylphosphate, bis(pentafluoroethyl)phosphinate, tris(pentafluoroethyl)-trifluorophosphate, tris(nonafluorobutyl)trifluorophosphate, etc.); antimonates (e.g., hexafluoroantimonate); aluminates (e.g., tetrachloroaluminate); fatty acid carboxylates (e.g., oleate, isostearate, pentadecafluorooctanoate, etc.); cyanates; acetates; and so forth, as well as combinations of any of the foregoing.

Several examples of suitable ionic liquids may include, for instance, spiro-(1,1')-bipyrrolidinium tetrafluoroborate, triethylmethyl ammonium tetrafluoroborate, tetraethyl ammonium tetrafluoroborate, spiro-(1,1')-bipyrrolidinium iodide, triethylmethyl ammonium iodide, tetraethyl ammonium iodide, methyltriethylammonium tetrafluoroborate, tetrabutylammonium tetrafluoroborate, tetraethylammonium hexafluorophosphate, etc.

As noted above, the ultracapacitor also contains a housing within which the electrode assembly and electrolyte are retained and optionally hermetically sealed. The nature of the housing may vary as desired. In one embodiment, for example, the housing may contain a metal container ("can"), such as those formed from tantalum, niobium, aluminum, nickel, hafnium, titanium, copper, silver, steel (e.g., stainless), alloys thereof, composites thereof (e.g., metal coated with electrically conductive oxide), and so forth. Aluminum is particularly suitable for use in the present invention. The metal container may have any of a variety of different shapes, such as cylindrical, D-shaped, etc. Cylindrically-shaped containers are particular suitable.

Figure 4:
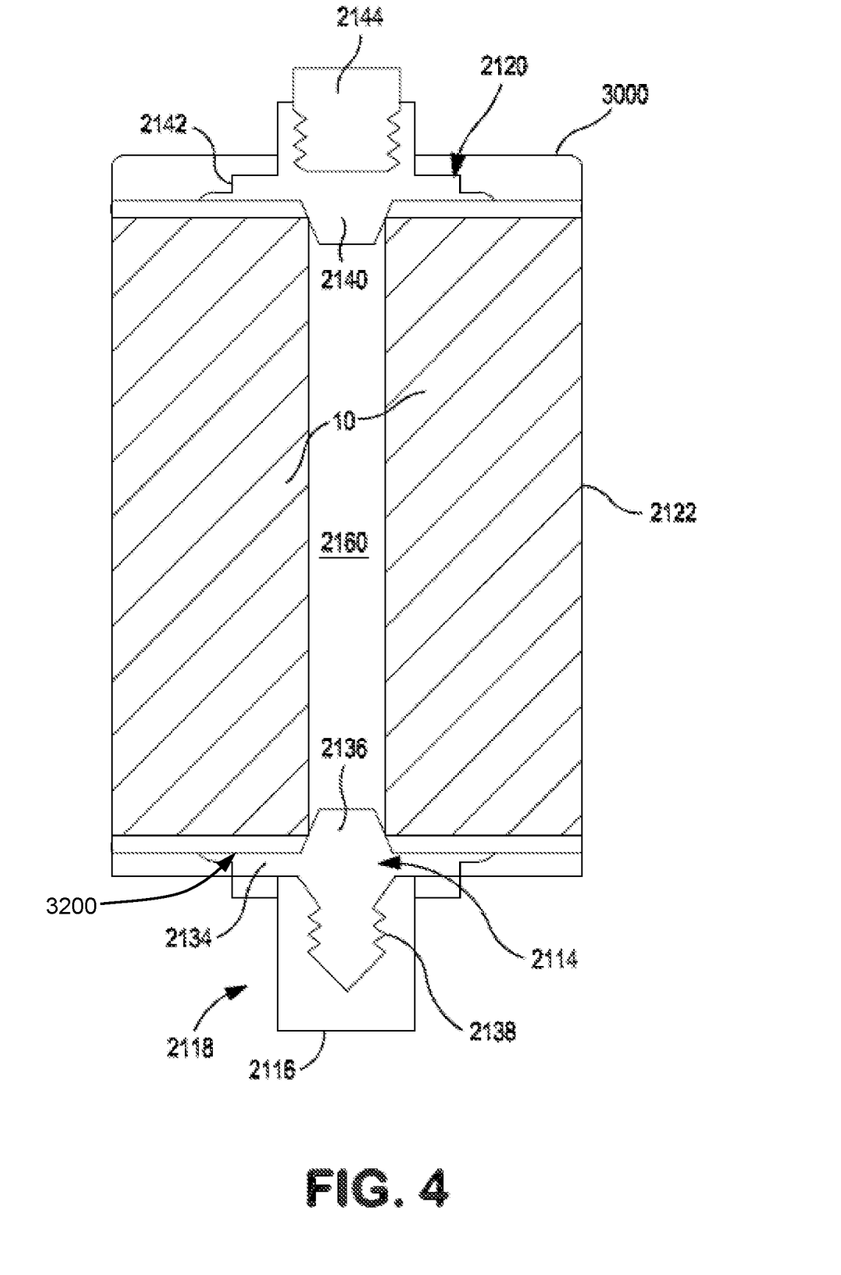
FIG. 4 is a schematic view of one embodiment of an ultracapacitor that may be employed in the module of the present invention.

Referring to FIG. 4, for instance, one embodiment of a housing that may be employed in the ultracapacitor is shown in more detail. In this particular embodiment, the housing contains a metal container 2122 (e.g., cylindrically-shaped can) that defines a base 3000 and an open end 3200. A lid 2118 is disposed over the open end 3200 and attached (e.g., welded) to the container 2122 to seal the housing. The lid 2118 may contain a first collector disc 2114, which includes a disc-shaped portion 2134, a stud portion 2136, and a fastener 2138 (e.g., screw). The collector disc 2114 is aligned with a first end of a hollow core 2160, which is formed in the center of the electrode assembly 10, and the stud portion 2136 is then inserted into an opening of the core so that the stud portion 2136 contacts the second current collector 40. In this manner, the second current collector 40 is placed into electrical contact with the lid 2118. The fastener 2138 may also be coupled (e.g., threadably connected) to a first terminal 2116. The metal container 2122 may likewise contain a second collector disc 2120, which includes a disc-shaped portion 2142, a stud portion 2140, and a second terminal 2144. The second collector disc 2120 is aligned with the second end of the hollow core 2160, and the stud portion 2140 is then inserted into the opening of the core so that the stud portion 2140 contacts the current collector 20. In this manner, the first current collector 20 is placed into electrical contact with the base 3000. Once formed, the terminals 2144 and 2116 may be connected with one or more additional ultracapacitors as described above. For example, the terminal 2144 (e.g., positive) may be connected with a terminal of an opposite polarity (e.g., negative) of a second ultracapacitor while the terminal 2116 (e.g., negative) may be connected with a terminal of opposite polarity (e.g., positive) of a third ultracapacitor.

The manner in which the ultracapacitors are connected may vary as known in the art. For example, the ultracapacitors may be connected using an interconnect that attaches to or connects the respective terminals of the ultracapacitors. The interconnect may be made of a conductive material, such as a conductive metal. In one embodiment, the interconnect may be relatively flat or may be one having an increased surface area. Regarding the latter, the interconnect may have projections/protrusions or may also be formed from wires, braids, coils, etc. In this regard, the specific dimensions and configuration of the interconnects is not necessarily limited. Regardless of its form, any of a variety of different conductive materials may be employed, such as copper, tin, nickel, aluminum, etc., as well as alloys and/or coated metals. If desired, the conductive material may optionally be insulated with a sheath material.

As is known in the art, the ultracapacitors may be electrically connected together in series or in parallel, depending on the particular properties desired. For instance, in one particular embodiment, the ultracapacitors may be electrically connected in series such that a terminal of a certain polarity (e.g., positive) of one ultracapacitor is connected to a terminal of opposite polarity (e.g., negative) of another ultracapacitor. For instance, the positive terminal may extend from a top portion of the first ultracapacitor and the negative terminal may extend from a bottom portion of the second ultracapacitor.

Figure 5:
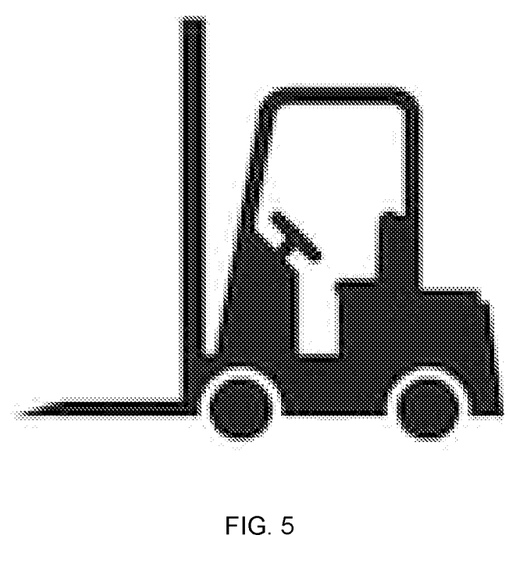
FIG. 5 is a perspective view of an industrial vehicle in accordance with one embodiment of the present invention.

Ultracapacitors and modules containing them can be employed to store large amounts of electrical charge. As a result, the modules and ultracapacitors of the present invention can be employed in a variety of applications. For instance, they can be used in a variety of energy applications including, but not limited to, wind turbines, solar turbines, solar panels, and fuel cells. In addition, they can also be used in a variety of transportation applications including, but not limited to, vehicles (e.g., battery propelled electric vehicles, hybrid electric vehicles including buses, engine starts, power and braking recuperation systems, etc.), trains and trams (e.g., maglev trains, track switching, starter systems, etc.), and aerospace (e.g., actuators for doors, evacuation slides, etc.). They also have a variety of industrial applications including automation (e.g., robotics, etc.), vehicles (e.g., fork lifts, cranes, electric carts, etc.). For example, FIG. 5 provides an illustration of one type of industrial vehicle, in particular a fork lift, that can utilize a module (not shown) as disclosed herein. They also have a variety of applications in consumer electronics (e.g., portable media players, handheld devices, GPS, digital cameras, etc.), computers (e.g., laptop computers, PDAs, etc.), and communications systems. The modules and ultracapacitors may also have a variety of military applications (e.g., motor startups for tanks and submarines, phased array radar antennae, laser power supplies, radio communications, avionics display and instrumentation, GPS guidance, etc.) and medical applications (e.g., defibrillators, etc.).

These and other modifications and variations of the present invention may be practiced by those of ordinary skill in the art, without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. A module comprising:
    at least two ultracapacitors, at least one balancing circuit, and at least one heat dissipation component comprising an active component, a passive component, or an active component and a passive component,
        wherein the balancing circuit is connected to the at least one heat dissipation component, wherein the at least one heat dissipation component is present on a heat sink comprising a metal having a thermal conductivity of about 50 W/m·K or more, wherein each ultracapacitor comprises a housing and a first brace surrounding at least a portion of only a circumference of each ultracapacitor, wherein the first brace only partially covers a circumferential area of each ultracapacitor, wherein the first brace of each ultracapacitor is connected by an interconnecting bridge, and a module housing, wherein the heat sink includes the module housing, the first brace of each ultracapacitor, and the interconnecting bridge, and wherein the at least one heat dissipation component is directly mounted on the module housing and the interconnecting bridge.

2. The module of claim 1, wherein the balancing circuit is connected between the two ultracapacitors.

3. The module of claim 1, wherein the module further contains at least another balancing circuit and wherein one of the at least two ultracapacitors is electrically connected to the at least one balancing circuit and another of the at least two ultracapacitors is electrically connected to the at least another balancing circuit.

4. The module of claim 1, wherein the at least one heat dissipation component is a transistor.

5. The module of claim 1, wherein the at least one heat dissipation component is a resistor.

6. The module of claim 1, wherein the metal comprises silver, copper, gold, molybdenum, zinc, lithium, tungsten, nickel, iron, palladium, platinum, tin, an alloy thereof, or a combination thereof.

7. The module of claim 1, wherein the metal comprises aluminum or an alloy thereof.

8. The module of claim 1, wherein the metal has a thermal conductivity of about 100 W/m·K or more.

9. The module of claim 1, wherein the heat sink has a surface area that is at least about 1,000% greater than the surface area of the at least one heat dissipation component.

10. The module of claim 1, wherein the module housing includes a top surface, a bottom surface opposing the top surface, and at least one side surface extending between the top surface and the bottom surface, wherein at least a part of the side surface defines the heat sink.

11. The module of claim 1, wherein each ultracapacitor includes a second brace surrounding at least a portion of a circumference of each ultracapacitor, wherein the first brace of each ultracapacitor is connected by an interconnecting bridge and the second brace of each ultracapacitor is connected by an interconnecting bridge, and wherein the braces and the interconnecting bridges also define the heat sink.

12. The module of claim 1, wherein the ultracapacitors are connected in series.

13. The module of claim 1, wherein the module contains at least two heat dissipation components per balancing circuit.

14. The module of claim 1, wherein the module contains at least one balancing circuit per ultracapacitor.

15. The module of claim 1, wherein the module contains from 8 to 30 ultracapacitors.

16. The module of claim 1, wherein each of the at least two ultracapacitors comprises:

an electrode assembly comprising a first electrode, a second electrode, and a separator positioned between the first and second electrodes;

a nonaqueous electrolyte that is in ionic contact with the first electrode and the second electrode; and wherein the electrode assembly and the electrolyte are contained in the housing of the respective each ultracapacitor.

17. The module of claim 16, wherein the first electrode comprises a first current collector electrically coupled to a first carbonaceous coating and the second electrode comprises a second current collector electrically coupled to a second carbonaceous coating.

18. The module of claim 16, wherein the electrode assembly has a jellyroll configuration.

19. The module of claim 16, wherein the ultracapacitor housing includes a container having a base and an open end, wherein a lid is disposed adjacent to the open end, and further wherein the electrode assembly is positioned within the ultracapacitor housing.

20. The module of claim 19, wherein the container is formed from a metal.

21. The module of claim 19, wherein the container has a cylindrical shape.

22. An industrial vehicle containing the module of claim 1 wherein the module provides power to the industrial vehicle.

* * * * *